Feb. 20, 1962  C. E. RYDEN  3,021,789
MOTOR SPEED CONTROL ARRANGEMENT
Filed Aug. 25, 1958  2 Sheets-Sheet 1

INVENTOR.
CARL E. RYDEN
BY
BUCKHORN, CHEATHAM & BLORE
ATTORNEYS

Feb. 20, 1962

C. E. RYDEN 3,021,789

MOTOR SPEED CONTROL ARRANGEMENT

Filed Aug. 25, 1958

INVENTOR.
CARL E. RYDEN
BY
BUCKHORN, CHEATHAM & BLORE

ATTORNEYS

United States Patent Office 3,021,789
Patented Feb. 20, 1962

3,021,789
MOTOR SPEED CONTROL ARRANGEMENT
Carl E. Ryden, 1600 Western Ave., Corvallis, Oreg.
Filed Aug. 25, 1958, Ser. No. 756,899
7 Claims. (Cl. 103—35)

The present invention relates to a motor speed control arrangement and more particularly to an arrangement for controlling the speed of a pump motor in response to changes in the condition of a system in which the pump is operating.

U.S. Patent No. 2,734,458 to Thomas B. Hayes discloses an arrangement for controlling the speed of a pump arranged to discharge liquid from a sump of a sewage system or the like. The speed of the pump motor and thus the pump is regulated to increase or decrease as the water level in the sump rises or falls, respectively, by means of a liquid rheostat connected across the secondary windings of the motor. In the embodiment shown in th Hayes patent, the rheostat is directly connected to the sump so that the liquid level in the rheostat will rise and fall directly as the level in the sump rises and falls.

Such an arrangement has certain disadvantages in that frequently it is impossible to install a rheostat immediately adjacent a sump and in other cases the cost is prohibitive. Also, in some instances, liquid from such a sump enters the rheostat and causes excessive corrosion of the rheostat plates. Certain other disadvantages are attendant to the arrangement shown in the patent but which are obviated by the present invention.

It is, therefore, an object of the present invention to provide a new and improved arrangement for controlling the speed of an electric motor. More particularly, it is an object of the invention to provide a new and improved arrangement for varying the level of electrolyte in a liquid rheostat connected to control an electric motor.

A further object of the invention is to provide an arrangement for detecting changes in the head in a fluid system and effecting a proportional change in the liquid level of a liquid rheostat positioned at a remote location and connected to the motor of a pump in such a system.

Still another object of the invention is to provide a control arrangement enabling inexpensive installation of a liquid rheostat type control for a pump motor in a system such as described.

Another object is to provide a liquid rheostat control system in which the rheostat electrolyte is isolated so that contamination thereof may not occur.

Other objects and advantages will become more apparent hereinafter.

In accordance with the illustrated embodiment of the invention, a wound rotor, induction type electric motor is connected to drive a pump of a fluid system having a varying head. The speed of the motor is regulated in accordance with the head of the system by means of a liquid rheostat including a pair of liquid chambers in one of which rheostat plates are supported. One of the chambers is sealed, whereby liquid may be moved from one of the chambers to the other by changing the pressure in such sealed chamber, thus to change the depth of immersion of and, consequently, the resistance between the rheostat plates, and means are provided to regulate the pressure in the sealed chamber in response to changes in the pressure in such system so that the speed of the motor and pump is regulated accordingly.

For a more detailed description of the invention, reference is made to the accompanying drawings showing the various embodiments thereof and which are to be taken together with the following specification.

Figure 1:
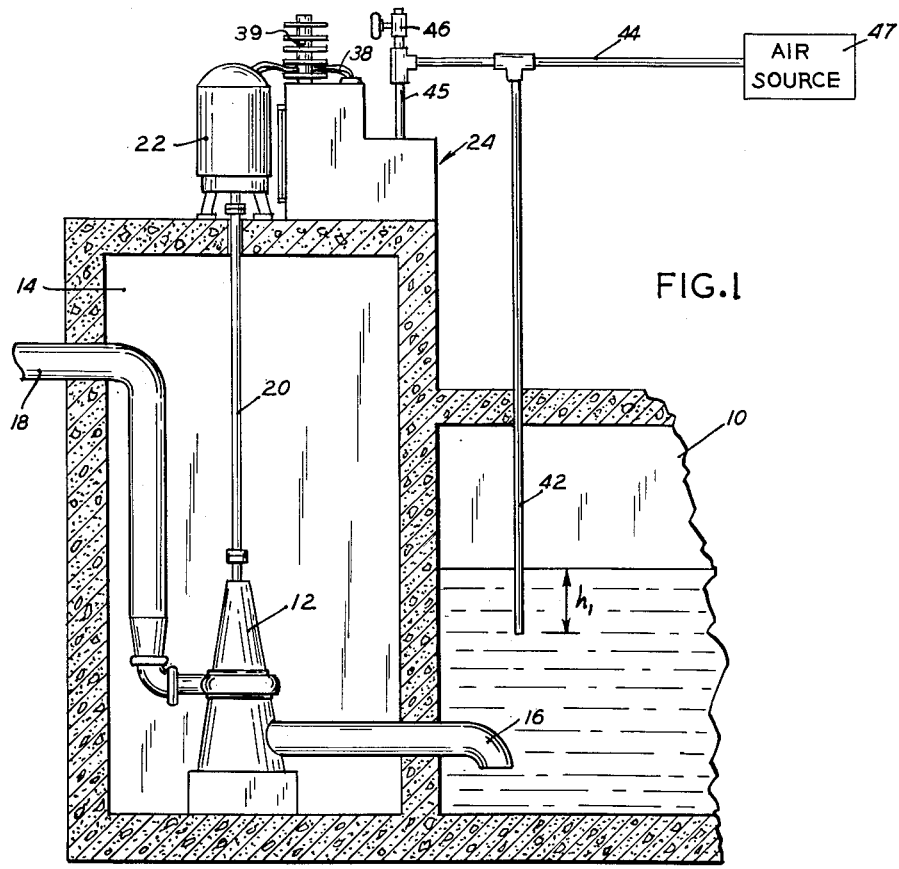
FIG. 1 is a schematic elevation of a control arrangement constructed in accordance with the invention.
Figure 2:
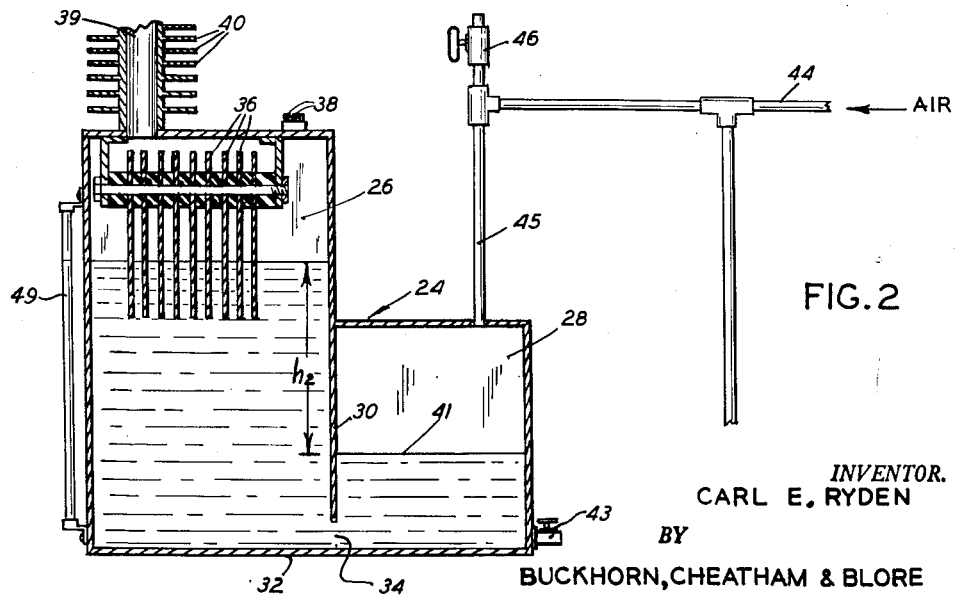
FIG. 2 is an enlarged schematic elevation in section of a liquid rheostat used in connection with the embodiment of FIG. 1.

Referring first to the embodiment of the invention shown in FIGS. 1 and 2, indicated at 10 is a sump into which liquid, such as liquid from the collecting system of a municipal sewer, is discharged at varying rates. The liquid in the sump 10 is pumped therefrom by a pump 12 mounted in a pump well 14 and having an inlet pipe 16 disposed in the sump 10 and an outlet pipe 18 for carrying the pumped liquid to a treatment plant or other desired location. Connected to drive the pump 12 by means of a shaft 20 is a motor 22 which is preferably selected from the class of motors adapted to be driven between predetermined minimum and maximum rates inverse to resistance values selected within the range of predetermined minimum and maximum values of an external resistance element electrically connected to a motor in such a manner that a change in resistance value will cause a change in the motor speed. An example of such a motor is a wound rotor, induction-type motor wherein changes in the resistance of the rotor circuit will cause change in the speed of the motor. In accordance with the present invention, the resistance in the motor circuit is provided by means of a liquid rheostat 24. Referring now more particularly to FIG. 2, the rheostat 24 comprises a rheostat plate chamber 26 and a reservoir chamber 28 separated at their upper portions by a dividing wall 30, which wall, however, is spaced above the bottom 32 of the rheostat so as to provide a passage 34 between the chambers 26 and 28. Suitably supported in the chamber 26 are a plurality of electrodes or plates 36 suitably insulated from one another and also suitably connected by conductors 38 to the rotor of the motor 22. The chamber 26 is provided with a vent tube 39 preferably having cooling fins 40 to assist in the condensation of electrolyte vapors ascending the tube 39. The chamber 28 is sealed save for the passage 34 and other connections thereto to be described hereinafter. Contained within the chambers 26, 28 is a liquid electrolyte 41 of such volume that when the level of the electrolyte in the chambers is the same, the electrolyte will be beneath the bottom edges of the rheostat plates 36. A sight tube 49 may be provided for observing the level of the electrolyte in the plate chamber 26 and the rheostat may be provided with a drain valve 43.

As will be evident, by increasing the pressure in the top of the reservoir chamber 28, the electrolyte can be forced out of the chamber 28 and into the plate chamber 26 and wherein the liquid level will, of course, rise. In the presently described embodiment of the invention, the pressure in the chamber 28 is maintained equal to the head in the sump 10 above a predetermined level in the sump by means of a bubbler tube arrangement including a bubbler tube 42 extending into the sump 10 and having its lower end positioned at the said predetermined level within the sump. The bubbler tube 42 is connected to a source of air pressure 47 by a conduit 44 having a branch 45 connected to the top of the chamber 28. A blow off valve 46 may be provided in the branch 45. As will be evident, the pressure in the conduit branch 45 will be automatically regulated in accordance with the depth of liquid in the sump 10 so that the difference in the liquid level between the chambers 26 and 28, as indicated in FIG. 2 at $h_2$, will be equal to the depth $h_1$ of the liquid above the end of the bubbler tube 42, as indicated in FIG. 1.

Thus, the area of immersion of the electrodes 36 will increase as the liquid level in the sump 10 increases and the electrolyte in the chamber 26 rises correspondingly.

As a result, the electrical resistance between the plates 36 will decrease effecting an increase in the speed of the motor 22 and pump 12. Correspondingly, if the liquid level in the sump 10 should drop, the pressure in the conduit branch 45 and reservoir chamber 28 will correspondingly drop causing electrolyte to flow into the reservoir member 28 from the plate chamber 26. As the electrolyte level in the latter chamber drops, lesser area of the plates 36 will be immersed increasing the rotor resistance and effecting a decrease in the speed of the motor 22 and pump 12.

The electrodes 36 may be so shaped as to give any desired change in electrical resistance as the electrolyte level changes so as to drive the pump 12 at any desired rate relative to the height of the liquid in the sump 10. The actual desired pumping characteristics for a particular system will depend upon the characteristics of the system and can be provided for by those skilled in the art.

Figure 3:
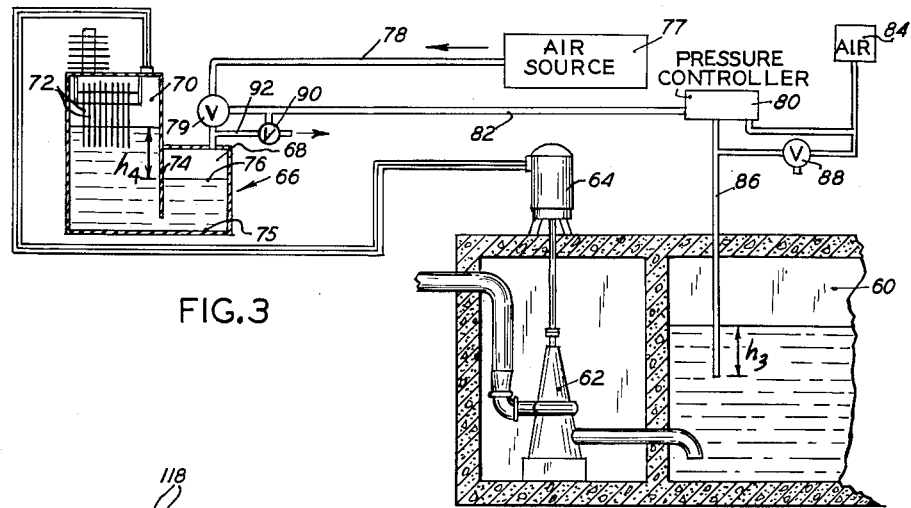
FIGS. 3, 4 and 5 are further schematic views of other embodiments of the invention.

In the embodiment described above, the head maintained in the rheostat chambers will, of course, be substantially equal to the head in the sump from which liquid is being pumped. In some cases, it may be desirable to proportionalize the change in level of the electrolyte in the rheostat relative to the change in head in the sump from which liquid is being pumped. A suitable arrangement for this purpose is shown in FIG. 3 wherein a sump is indicated at 60 and from which liquid is pumped by means of a pump 62 driven by a motor 64 having the characteristics like that of the motor 22 described above. The speed of the motor 64 is controlled by means of a liquid rheostat plate chamber 70 in which rheostat plates 72 are fixedly suspended. As in the previously described embodiment, the chambers 70, 68 are separated by a dividing wall 74 which terminates a slight distance above the bottom 75 of the rheostat so as to provide a passageway for movement of electrolyte 76 between chambers. Air under pressure is supplied to the sealed chamber 68 from a suitable source 77 through a pipe 78 containing a control valve 79 which is operated in response to any increase in the head $h_3$ in the sump 60 to admit air to the chamber 68 so as to effect a proportional increase in the head $h_4$ in the rheostat 66. The control valve 79 is preferably a pneumatically operated valve. An example of suitable valves for this purpose is Fisher Governor Co. Type 164 series diaphragm control valves, and which is illustrated in Fisher Governor Co. Bulletin C–20, page 10.

The control valve means also includes a control valve 90 which is operable to bleed air from the chamber 68 when the sump head $h_3$ falls to effect a proportional decrease in the head $h_4$ in the rheostat 66. The valve 90 is shown connected in a bleed off line 92 connected to the pipe 78 between the valve 79 and the chamber 68. The control valve 90 also is preferably a pneumatically operated valve, the Fisher Governor Co. Type 164 series diaphragm control valves being examples of suitable valves.

The control valves 79, 90 are controlled by means of a pressure controller 80. The pressure controller 80 is preferably of the type having an output pressure line 82 connected to the control valves 79 and 90 for operating the same, the pressure in the line 82 being maintained proportional to the head $h_3$ of the sump 60. Air is supplied to the controller 80 from a source 84 and a signal pressure is brought to the pressure controller 80 through a bubbler tube 86 connected to the source 84 through a throttling valve 88 and to the pressure controller 80. As will be apparent, the pressure in the bubbler tube 86 will be equal to the sump head $h_3$. An example of a suitable pressure controller is Fisher Governor Company Type 4162 Pressure Controller and which is illustrated in Fisher Governor Company Bulletin D–4150A.

Control valves of the type specified can be adjusted so that in the case of the control valve 79 air is admitted to chamber 68 when the pressure in line 82 increases, and in the case of the control valve 90 air is bled from the chamber 68 when the pressure in the line 82 decreases. Thus, by suitable adjustment of the pressure controller 80 and control valves 79 and 90, the electrolyte head $h_4$ and the head $h_3$ of the liquid in the sump 60 can be maintained at some fixed ratio exemplified by the equation $h_3=Kh_4$, where K is a constant, so that the desired control can be maintained over the pump 62 relative to the head $h_3$.

The operation of this embodiment is as follows: Assuming first that the liquid level in the sump 60 rises effecting an increase in the head $h_3$, the pressure in the bubbler tube 86 will increase causing the pressure controller 80 to effect an increase in the pressure in the output line 82 thereof. In response to this increase in pressure in the output line 82 the control valve 79 will operate to admit additional air from the source 77 to the reservoir chamber 68 increasing the pressure therein and causing electrolyte to be forced therefrom and into the plate chamber 70. The rise of liquid level in the plate chamber 70 will, of course, cause a decrease in resistance between the plates 72 and consequent increase in speed of the motor 64 and pump 62. If, on the other hand, the liquid level in the sump 60 should decrease effecting a decrease in the head $h_3$, the pressure in the bubbler tube 86 will also decrease whereupon the pressure controller will operate to effect a decrease in the pressure in the outlet line 82. This will cause the control valve 90 to vent some of the air from the reservoir chamber 68 decreasing the pressure therein and causing electrolyte to flow from the plate chamber 70 into the reservoir chamber. As the immersed area of the plates 72 decreases, the resistance between the plates will increase effecting a decrease in the speed of the motor 64 and the pump 62.

It will be apparent to those skilled in the art that instead of using separate control valves such as the valves 79, 90 to admit and remit air from the chamber 68, single unit valves are available that will operate to perform both functions. However, I have found that a less expensive and less complicated installation can be made utilizing separate valves as shown.

Figure 4:
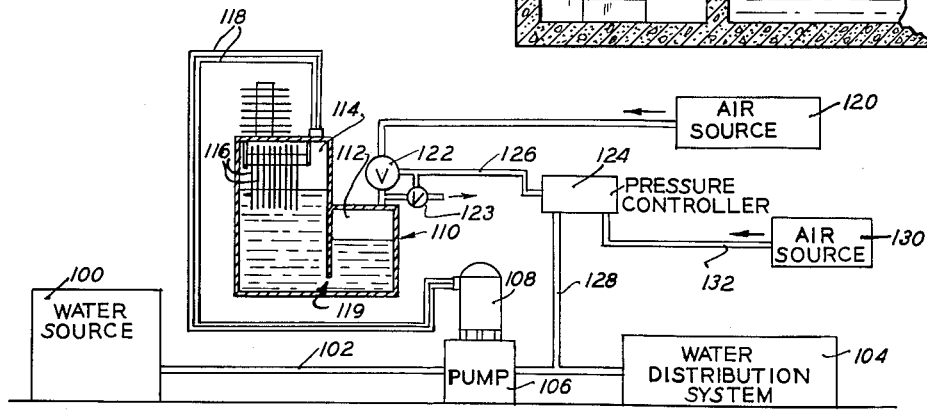

A further application of the control arrangement of the invention is shown in FIG. 4 wherein the arrangement is utilized in a water distribution system including a source of water 100 connected through a trunk 102 to a distribution system indicated at 104. Provided in the trunk 102 is a pump 106 for aiding the flow through the trunk in response to the demand of the system 104. Indicated at 108 is a pump motor which is controlled through a liquid rheostat 110 having a sealed reservoir chamber 112 and vented rheostat plate chamber 114 in which plates 116 are fixedly suspended, the plates being connected to the motor through suitable conductors 118. Electrolyte within the chambers may pass from one to the other through a passage 119. Air under pressure is supplied to the chamber 112 from an air source 120 connected to the chamber through control valve 122, which preferably is of the same type as the valves 79 and 90 described above, and air may be vented from the chamber 112 through a control valve 123. The valves 122 and 123 in this case are operated by a reverse pressure controller 124 having an output line 126 connected to the control valves 122 and 123 for operating the same. The pressure controller 124 again may be of the type specified above connected, however, to have a reverse control action. The pressure in the water distribution system 104 is sensed by means of a duct 128 connected to the conduit 102 at a point downstream from the pump 106. Air is supplied to the pressure controller 124 from a source 130 through a conduit 132. As pressure in the water distribution system 104 decreases indicating necessity for an increase in the rate of the pump 106, the decrease in pressure will be sensed by the reverse pressure controller 124 which will operate in this case to increase the pressure in the output line 126. This increase in pressure will operate the valve 122 to admit additional air from the source 120 to the reservoir 112, thus forcing the liquid from the reservoir chamber 112 into the plate chamber 114 decreasing the resistance between the plates 116 with the result that the speed of the motor 108 will increase to pump additional water from the source 100 to the distribution system 104. As the pressure in the system 104 rises, the increase in pressure will again be sensed by the pressure controller 124 and which will operate to decrease the pressure in its output 126 causing the valve 123 to operate to vent some of the air from the reservoir chamber 112 whereby the liquid level will drop in the plate reservoir 114 increasing the resistance between the plates 116 and effecting a decrease in the speed of the motor 108 in the pump 106.

Figure 5:
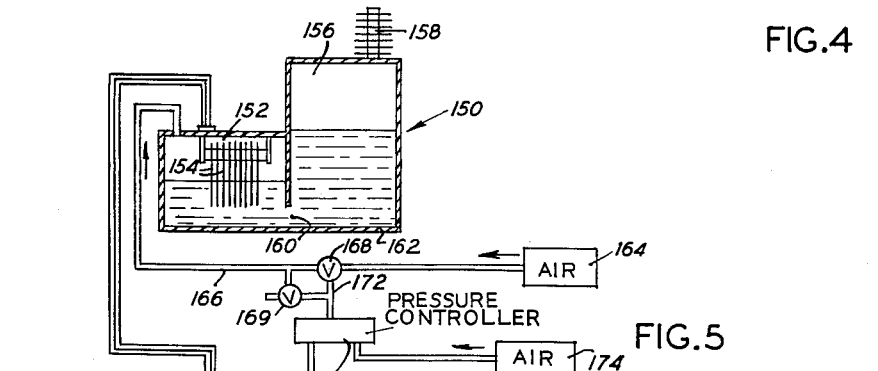

FIG. 5 shows still another suitable arrangement of a rheostat and in which the rheostat plates are mounted in the sealed chamber and the reservoir chamber is vented. Referring now more particularly to FIG. 5, the control arrangement is again shown in connection with a water distribution system including a source of water 140 connected through a trunk 142 to a distribution system 144, a pump 146 being provided to pump water from the source 140 to the distribution system 144, the pump being driven by a motor 148. The motor 148 is controlled by means of a liquid rheostat 150 including a sealed rheostat plate chamber 152 having a plurality of plates 154 fixedly suspended therein. The rheostat 150 is provided with a reservoir chamber 156 vented through a finned vent tube 158, the chamber 156 and chamber 154 being connected by means of a passage 160 adjacent the bottom 162 of the rheostat. Air is supplied to the top of the chamber 152 from an air source 164 through a conduit 166 containing a control valve 168. Air is vented from the chamber 152 through a control valve 169. The control valves 168, 169 may be of the same type as the control valves 79 and 90 described above. The control valves 168 and 169 are controlled by means of a pressure controller 170 which preferably is of the same type as the pressure controller 80 described hereinbefore, the pressure controller 170 being connected to the control valves 168 and 169 by a controller output pipe 172, and the controller 170 being supplied with air from an air source 174. Obviously, though a separate air source 174 is shown for operation of the pressure controller 170, air for the same could be obtained from the same source as that supplying air to the reservoir chamber 152. This is true also in the embodiments described above. Pressure in the distribution system 144 is sensed and applied to the pressure controller 170 by means of a duct 176 connected to the trunk 142 downstream of the pump 146. In the present system, as pressure in the distribution system 144 falls, the pressure controller 170 will operate to decrease the pressure in the output 172 causing the control valve 169 to vent some of the air from the plate chamber 152. Liquid will, accordingly, rise in the chamber 152 decreasing the resistance between the plates 154 and effecting an increase in the speed of the motor 148 and the pump 146. As the pressure in the system 144 increases, reverse action will occur and air will be admitted to the plate chamber 152 through control valve 168 forcing liquid therefrom and increasing resistance between the plates 154 and decreasing the speed of the motor 148 and pump 146.

As will be evident, the described embodiments have several advantages. For example, it will be apparent the control systems described can be provided in existing fluid systems with little difficulty since only minor, if any, structural modifications of the fluid system are required. Furthermore, the rheostat is isolated from the system being controlled so that no contamination of the electrolyte will occur. This makes practical selection of an electrolyte which will give rise to a minimum of corrosion problems and also helps in maintaining a constant quality in the electrolyte so that accurate control can be maintained. Furthermore, by proportionalizing the effect of the change in the system head, any desired degree of sensitivity of control can be secured.

Having illustrated and described a preferred embodiment of the invention, it should be apparent to those skilled in the art that the invention permits modification in arrangement and detail. I claim as my invention all such modifications as come within the true spirit and scope of the appended claims.

I claim:

1. A fluid system having a fluctuating head, motor, a control arrangement system for controlling the speed of said motor in response to changes in the fluid head of said system, said control arrangement including a liquid rheostat connected to said motor to control the speed thereof, said rheostat comprising means defining a pair of side-by-side electrolyte chambers, an electrolyte in said chambers, means connecting the lower portions of said chambers for permitting electrolyte freely to flow between said chambers, one of said chambers being sealed save for said connecting means and the other chamber being vented, said rheostat comprising a plurality of vertical electrodes fixedly mounted in one of said chambers, air supply means connected to said sealed chamber for supplying air under pressure to said sealed chamber so that by variation in such pressure electrolyte may be transferred between said chambers so as to vary the amount of immersion of said electrodes, means for sensing the pressure head of the fluid in said fluid system, and means operatively connecting said sensing means and said air supply means for controlling the pressure of air supplied to said sealed chamber in response to changes in the pressure in said fluid system.

2. A fluid system having a fluctuating head, a motor, a control arrangement for controlling the speed of said motor in response to changes in the fluid head in said fluid system, said control arrangement including a liquid rheostat connected to said motor to control the speed thereof, said rheostat comprising means defining a pair of side-by-side electrolyte chambers, an electrolyte in said chambers, means connecting the lower portions of said chambers for permitting electrolyte freely to flow between said chambers, one of said chambers being sealed save for said connecting means and the other chamber being vented, said rheostat comprising a plurality of vertical electrodes fixedly mounted in one of said chambers, air supply means connected to said sealed chamber for supplying air under pressure to said sealed chamber so that by variation in such pressure electrolyte may be transferred between said chambers so as to vary the amount of immersion of said electrodes, means for sensing the pressure head of the fluid in said fluid system, and means operatively connecting said sensing means and said air supply means for controlling the pressure of air supplied to said sealed chamber in response to changes in the pressure in said fluid system.

3. A fluid system, a pump for supplying fluid to such system, a control arrangement for controlling the speed of such pump in response to changes in the head in such system, said control arrangement including a motor connected to drive said pump, a liquid rheostat connected to said motor to control the speed thereof, said rheostat comprising means defining a pair of side-by-side electrolyte chambers, an electrolyte in said chambers, means connecting the lower portions of said chambers for permitting electrolyte freely to flow between said chambers, one of said chambers being sealed save for said connecting means and the other chamber being vented, said rheostat comprising a plurality of vertical electrodes mounted in said sealed chamber, air supply means connected to said sealed chamber for supplying air under pressure to said sealed chamber so that by variation in such pressure electrolyte may be transferred between said chambers so as to vary the amount of immersion of said electrodes, means for sensing the pressure head of said fluid, and means operatively connecting said sensing means and said air supply means for controlling the pressure of air supplied to said sealed chamber in inverse ratio to changes in the head of said system.

4. A fluid system, a pump for supplying fluid to such system, a control arrangement for controlling the speed of such pump in response to changes in the head in such system, said control arrangement including a motor connected to drive said pump, a liquid rheostat connected to said motor to control the speed thereof, said rheostat comprising means defining a pair of side-by-side electrolyte chambers, an electrolyte in said chambers, means connecting the lower portions of said chambers for permitting electrolyte freely to flow between said chambers, one of said chambers being sealed save for said connecting means and the other chamber being vented, said rheostat comprising a plurality of vertical electrodes mounted in said sealed chamber, air supply means connected to said sealed chamber for supplying air under pressure thereto, valve means operatively connected with said air supply means for controlling the pressure of air supplied to said chamber, pressure responsive valve operating means connected to said valve means, and means for subjecting said valve operating means to the fluid pressure in said system so as to effect operation of said valve means in response to changes in the fluid pressure in said system.

5. A fluid system, a fluid pump for supplying fluid to such system, a control arrangement for controlling the speed of such pump in response to changes in the fluid head in such system, said control arrangement including a motor connected to drive said pump, a liquid rheostat connected to said motor to control the speed thereof, said rheostat comprising means defining a pair of side-by-side electrolyte chambers, an electrolyte in said chambers, means connecting the lower portions of said chambers for permitting electrolyte freely to flow between said chambers, one of said chambers being sealed save for said connecting means and the other of said chambers being vented, said rheostat comprising a plurality of vertical electrodes fixedly mounted in one of said chambers, a source of air under pressure, control valve means connecting said source to said sealed chamber whereby by variation in pneumatic pressure in such chamber electrolyte may be transferred between said chambers so as to vary the amount of immersion of said electrodes, a pressure responsive valve operating means connected to said control valve means, and means for subjecting said valve operating means to the fluid pressure in said system so as to effect operation of said control valve means in response to changes in the fluid pressure in said system.

6. A fluid system, a sump, a fluid pump mounted in said sump to discharge fluid therefrom, a control arrangement for controlling the speed of such pump in response to changes in the depth of fluid in such sump, said control arrangement including a wound rotor, induction type motor connected to drive said pump, a liquid rheostat connected to said motor to control the speed thereof, said rheostat comprising means defining a pair of side-by-side electrolyte chambers, an electrolyte in said chambers, means connecting the lower portions of said chambers for permitting electrolyte freely to flow between said chambers, one of said chambers being sealed save for said connecting means and the other of said chambers being vented, said rheostat comprising a plurality of vertical electrodes mounted in said other chamber, a source of air under pressure, conduit means connected to said pressure source including a first branch tube extending into said sump and terminating below the surface of the fluid therein, and a second branch tube connected to said sealed chamber, whereby as the fluid level in said sump changes the pressure of air supplied to said sealed chamber will change proportionately to effect flow of fluid between said chambers in response to changes in the level of fluid in said sump.

7. A fluid system, a sump, a fluid pump mounted in said sump to discharge fluid therefrom, a control arrangement for controlling the speed of such pump in response to change in the depth of fluid in such sump, said control arrangement including a wound rotor, induction type motor connected to drive said pump, a liquid rheostat connected to said motor to control the speed thereof, said rheostat comprising means defining a pair of side-by-side electrolyte chambers, an electrolyte in said chambers, means connecting the lower portions of said chambers for permitting electrolyte freely to flow between said chambers, one of said chambers being sealed save for said connecting means and the other of said chambers being vented, said rheostat comprising a plurality of vertical electrodes mounted in said other chamber, a source of air under pressure, control valve means connecting said source to said sealed chamber whereby by variation in pneumatic pressure in such chamber electrolyte may be transferred between said chambers so as to vary the amount of immersion of said electrodes, a second source of air under pressure, a conduit from said second source terminating at a fixed point beneath the surface of the fluid in said sump whereby pressure in said conduit will vary proportionately to the depth of fluid in said sump, a pneumatic controller connected to said control valve means for operating the same, said pneumatic controller being connected to said conduit and responsive to changes in pressure therein and effective to control said control valve means to maintain the pressure in said sealed chamber in ratio to the depth of fluid in said pump.

References Cited in the file of this patent

UNITED STATES PATENTS

| | | |
|---|---|---|
| 1,664,250 | Eynon | Mar. 27, 1928 |
| 1,757,339 | Seeger | May 6, 1936 |
| 2,219,147 | Binder et al. | Oct. 22, 1940 |
| 2,246,295 | Cook | June 17, 1941 |
| 2,548,745 | Smith | Apr. 10, 1951 |
| 2,734,458 | Hayes | Feb. 14, 1956 |
| 2,735,057 | Schaelchlin et al. | Feb. 14, 1956 |